Dec. 4, 1945. A. REDLER 2,390,389
CINEMATOGRAPH APPARATUS
Filed Oct. 20, 1942 5 Sheets-Sheet 2

Dec. 4, 1945.  A. REDLER  2,390,389
CINEMATOGRAPH APPARATUS
Filed Oct. 20, 1942   5 Sheets-Sheet 4

Inventor,
Arnold Redler
By J. Stanley Churchill
Atty

Dec. 4, 1945.  A. REDLER  2,390,389
CINEMATOGRAPH APPARATUS
Filed Oct. 20, 1942   5 Sheets-Sheet 5

Patented Dec. 4, 1945

2,390,389

UNITED STATES PATENT OFFICE 2,390,389

CINEMATOGRAPH APPARATUS

Arnold Redler, Stroud, England

Application October 20, 1942, Serial No. 462,713
In Great Britain October 24, 1941

16 Claims. (Cl. 88—18)

This invention relates to cinematograph apparatus and although primarily designed for projectors it may with suitable modification be applied to cinematograph cameras.

The invention has for its object to provide for a cine projector (or camera) of otherwise known construction, film feed drive and control mechanism, which will permit the exposure of films or the viewing of pictures or frames, at a variable number per second which is selective at will, the speed of change between successive frames remaining constant at least cine speed irrespective of the period of dwell of each frame between the changes.

To avoid confusion or ambiguity the exposed or projected unit area of the film will be referred to as a frame (as is usual in cinematography); the number of frames exposed or projected per second as the successive frame-speed or frequency; the time taken to change one frame to the next as the film advance or shift speed; and cine speed to mean 16 frames per second.

It has been found that for many subjects, especially those of an architectural or illustrative nature, where little or no movement is apparent or required, it is sufficient when taking the photographs to expose a relatively short length of film, either cinematographically or otherwise, and to project these on a screen as virtual "stills," each frame being shown for a longer period than ordinary cine speed, the period being selected according to the subject taken or viewed or the effect desired.

It will be understood that where a sufficiently strong light is used for efficient projection to cover the larger screen areas, the film can only be exposed to the heat of the light beam for a short time to avoid buckling or blistering of the film, e. g., not exceeding one second, and it is one of the principal objects of the present invention to utilise this relatively long period of dwell for suitable subjects having little or no movement as aforesaid by taking, for example, a series of photographs, which may be at cine speed in the first place, on a short length of film with the minimum number of frames; which may, when projected on a screen be spread over a relatively long period of time and which will produce an effect similar to that usually obtained when exposing a long length of film comprising numerous identical frames (or nearly so) and projecting these for the same period at ordinary cine speed.

The invention also seeks to provide in the same apparatus one which not only enables portions of a film taken at cine speed to be shown selectively as "stills" (i. e., at one per second) or cinematographically (i. e., at 16 frames per second) but also, for special or suitable subjects (e. g., those with a small or extremely fast movement such as fast running machinery) at a speed intermediate of these.

Many advantages are gained by apparatus giving the above desirable results, among them being that considerably less film is used for a given time of exposure or projection, and consequently great economy in the total cost thereof is attained as well as greater latitude and adaptability made available for the subject under treatment. Further, the shutter is arranged always to operate at cine speed no matter at what number per second the frames are being shown, thus producing a cine effect when "stills" are being projected and also obviating any special precautions being required to prevent damage to the film by the heat of the lamp as the period of dwell is not increased, above the safety period, such precautions having to be provided in known apparatus.

This cine effect given by a constant speed shutter with frames of relatively long period of dwell is of great advantage as a smooth action and even lighting is produced without perceptible change throughout the film at all times.

A further object is to provide means by which the successive frame-speeds or frequency of successive frames may be readily changed at will by hand at the apparatus itself or from a distance. If desired, means may also be provided in which the film itself controls or operates the change of speed of the film feed.

With the above objects in view and according to this invention, cine camera or projector apparatus having film feed mechanism is characterised by being provided with two continuously driven elements, one controlling the rate or frequency of successive frames (i. e., the number per second) and the other controlling the speed of film advance or film shifting speed (i. e., the time taken to change one frame to the next) the two elements co-operating in such manner that a part of the movement of the successive frame drive, at speeds less than cine, is utilised by the film advance drive to advance the film or to permit the film to be advanced at cine speed or more.

In essence, the elements may take the form of parts that are revolving, the successive frame speed element turning at a definite number of revolutions per second, the frame advance speed element taking up part of each revolution of the first, at a speed which is greater than the successive frame speed and at a predetermined point in a revolution to advance the film correspondingly.

According to further and important features, the speed of the element controlling the rate of successive frames is variable and the speed of the film advance control is constant, means being provided by which the speed of the first may be selectively varied and means by which the speed of the second may be imposed on that of the first at the predetermined point to advance the film at cine speed or more.

Preferably, the two elements are mounted coaxially on or in relation to, a driven shaft and the variable speed element controlling successive frames comprises a series of gears (preferably three in number) of different ratios mounted freely on the driven shaft, each gear in permanent engagement with a complementary gear on a driving shaft revolving at constant speed and from which the cine speed is taken, means being provided by which a driven gear may be selectively coupled to the driven shaft, for the purpose of changing the speed thereof. Each of the driven gears has a pawl and ratchet associated therewith through which the drive to the shaft is transmitted, the ratchet being capable of overrunning its gear when a speed greater than that of the gear is imposed thereon. The means by which a gear is selected and coupled to the shaft preferably comprises a clutch member slidably keyed thereon and operable by a lever or the like outside the machine.

According to further features of the invention, the ratchets and/or the clutch member have means (for example a single tooth) by which a definite relationship is obtained with a film advance control mechanism just prior to the action of the latter, and the film advance control device takes the form of a fixed cam-like disc having a depression or the like in its periphery which decides the time and extent of the film advance. Conveniently, the cam-disc is fixed to the casing of the apparatus adjacent a gear driven at the highest speed, the pawl of the latter having a pin or the like thereon which projects over the cam to engage its edge in such manner that when the pin is in the depression it will drive the film advance mechanism but when on the raised part of the cam will be free of the driving member. In an embodiment the driving member comprises a ratchet or the like having a single tooth in definite relationship with the film advance mechanism which is engaged by the driving pawl during its travel along the depression in said cam.

In a specific construction, the selective gear speeds which control the rate of successive frames are of the order of sixteen revolutions (or frames) per second, or one revolution (or frame) per second, or at a rate intermediate of these and the feed advance speed is never less than the highest frame speed. In action the lowest speed gear is always driving and the higher speed gear drives are capable of overrunning said lower speed drive when imposed thereon.

Cine camera or projector apparatus, according to the invention, is further characterised by being provided with reverse driving means which is identical with the forward drive but in opposite driving sense and which is designed to automatically come into operation when the motive power is reversed. In the preferred form, the reverse driving means for the higher gears comprises a second single tooth or the like on the same ratchet as the forward driving tooth and a second pawl mounted on the gear in such relation to the forward pawl that the distance between the engaging noses of the pawls is less than the distance between the two teeth, by this means the ratchet may readily overrun the pawl.

In a preferred example, the reverse driving means for the lowest gear comprises a second ratchet adjacent the forward ratchet and a reversed pawl integral with the forward pawl, the duplex pawl being pivotally mounted on said gear in such manner that on reversing the drive means will operate to lift one pawl out of engagement while the other is simultaneously put into engagement with their respective ratchets, each ratchet having multiple teeth thereon (e. g., at least 16). Said means by which the pawls are put into or out of engagement with the ratchets may comprise a resilient arm centrally fixed between the pawls and a friction plate or disc which is in contact with a stationary part of the machine, the plate having a notch in the periphery thereof with which the free end of the arm engages, the said plate being temporarily prevented from turning at the initial drive of said gear thereby rocking the duplex pawl about its pivot, a pin or abutment being also provided on said gear to subsequently drive the plate with the gear. Means may be provided by which the pawls are forcibly freed from the ratchets, and such may consist of a side projection on each pawl which overlaps the adjacent ratchet and engages a tooth thereof in such manner that on one of the ratchets being driven reversely (the other being held stationary) the said engaged tooth will force the projection outwardly and thus disengage its pawl from its ratchet, a spring being also provided within each ratchet which co-operates with a key or the like on the shaft to permit the necessary relative movement, as will be seen in the specific construction hereinafter described.

According to further important features, the variable speed mechanism for successive frames, and the film advance mechanism herein proposed, may be provided with means by which a speed change for successive frames may be mechanically operated or controlled by the film. This preferably takes the form of a trigger or like device having a first part which may be placed in sensitive contact with the film and a second part co-operating with retaining or releasing means associated with a clutch or like member such that when a preselected point of the film engages the sensitive part, the said speed will be quickly changed.

The trigger device itself may take the form of a pivoted two-armed lever having one arm (the first part) adjacent the film at the end of which is provided a light spring plunger, the other arm (the second part) being remote from the film and having thereon a catch which is capable of engaging one of a series of notches in a disc, the latter being fixedly mounted on the member which operates the clutch member, the disc holding the clutch in engagement against spring pressure until the point on the film (e. g., a notch in its edge) engages the plunger and trips the trigger to release the clutch.

The member in the preferred embodiment which operates the clutch comprises a rod having a setting lever fixed thereto outside the casing the latter being provided with means by which it may be retained as set yet, when moved, further is free to return when the control from the film operates. The said further movement of the setting lever flexes a spring, the latter being fixedly mounted on the rod and through which the clutch member is put into or out of engagement with the shaft driving gears. The said spring does not act directly on the clutch member but through a yoke-like bar carried at its ends on the free ends of a pair of clutch operating levers mounted freely on the rod, the other end of the levers engaging the clutch, the parts being so arranged that when the spring is flexed by the lever and then released by the film trigger device an impulse will be given to quickly release the clutch.

When a reverse drive is incorporated in cine projection apparatus having the above features, it may be desirable to provide film tensioning means to ease the film through the gate, such a film tensioning device in the embodiment in mind is positioned at the other end of the gate to the film advance mechanism and this will remain inoperative during the forward running of the film but will be brought into action automatically on reversing the drive. The film tensioning means proposed comprises a vertical plate slidably mounted on the casing by guiding means and has at its upper end a roller positioned within an upper loop of the film, a spring being provided through which the plate and roller are raised into contact with the film to take up the latter as it is fed through the gate by the film advance mechanism. The said spring is carried by a rod freely sliding in a bracket on the slide-plate, the rod having an abutment at its upper end by which it can be raised to compress the spring and thus resiliently lift the roller into contact with the film. The rod has a greater movement than the plate to compress the spring still further after contact with the film is made, and so the film is maintained in tension.

The tensioning device is preferably brought into or out of action by the means which control the direction of drive of the motor, and this may comprise a lever on the outside of the apparatus having a second and forked lever inside the casing fixedly associated therewith such that on placing the motor lever in the position for reverse drive the second lever will simultaneously be moved in contact with the abutment on the spring pressure rod to permit the film tensioning device to function.

The said second lever also co-operates with means to move the trigger device to a "safety" position on reversing the film, and said means comprises a rod having at its upper end a finger-like projection which is engaged by the second lever at the end of its upward movement to hold the trigger clear of the film.

As will be seen hereinafter the invention as a film feed drive mechanism may be designed as an integral part of cine apparatus or it may be in the form of an attachment which can be applied with suitable adaptation to existing apparatus having different types of film feed operating means. Shock-absorbing means may be provided such as hereinafter described.

A specific embodiment of the invention with several adaptations will now be described, reference being made to the accompanying drawings in which:

Figure 7A is a view of the speed control lever set to neutral; Figure 7B shows the high and intermediate ratio gears also in neutral and Figure 7C the trigger mechanism which is film operated in a position corresponding to Figures 7A and 7B.

Figures 8A, 8B and 8C show similar views respectively, but with the various parts set to show the film at 16 frames per second.

Figures 9A, 9B and 9C show the same parts but with the control lever set to bring the trigger mechanism in a position to contact the film and so change the rate of successive frame speed at a pre-selected point of the film.

Like letters indicate like parts throughout the drawings.

Figure 1:
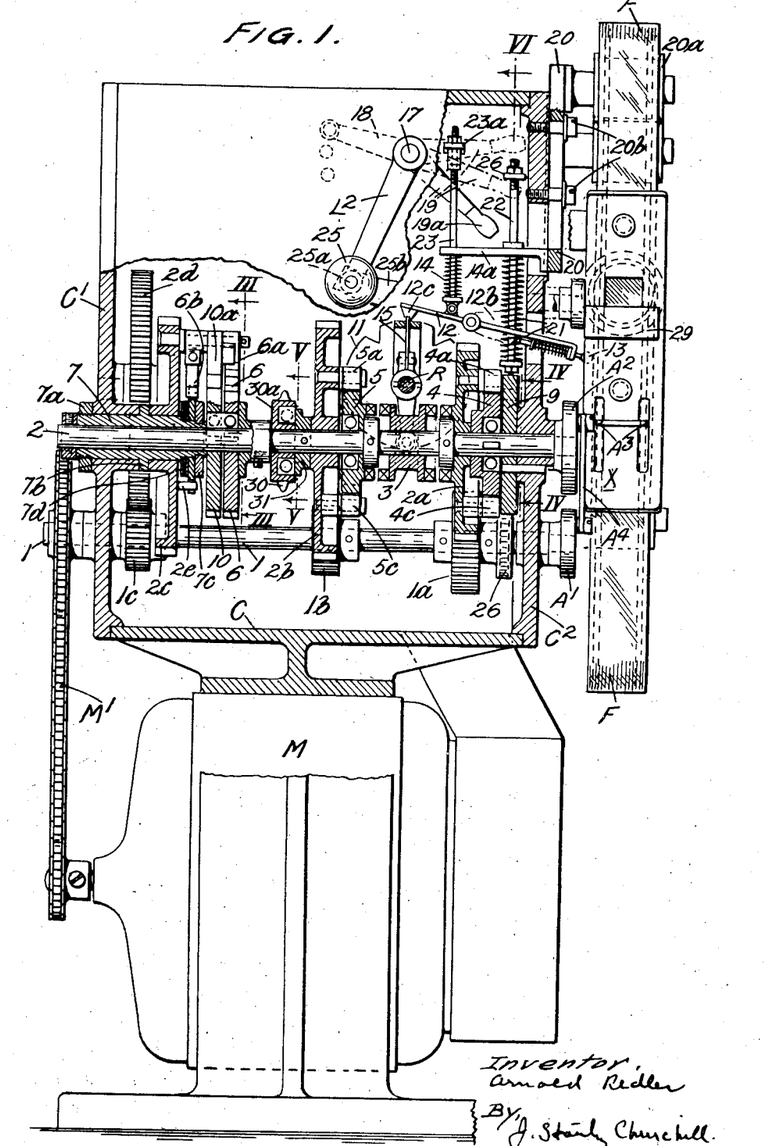
Figure 1 is a rear view partly in section of a cine projection apparatus having the features as herein set forth.
Figure 2:
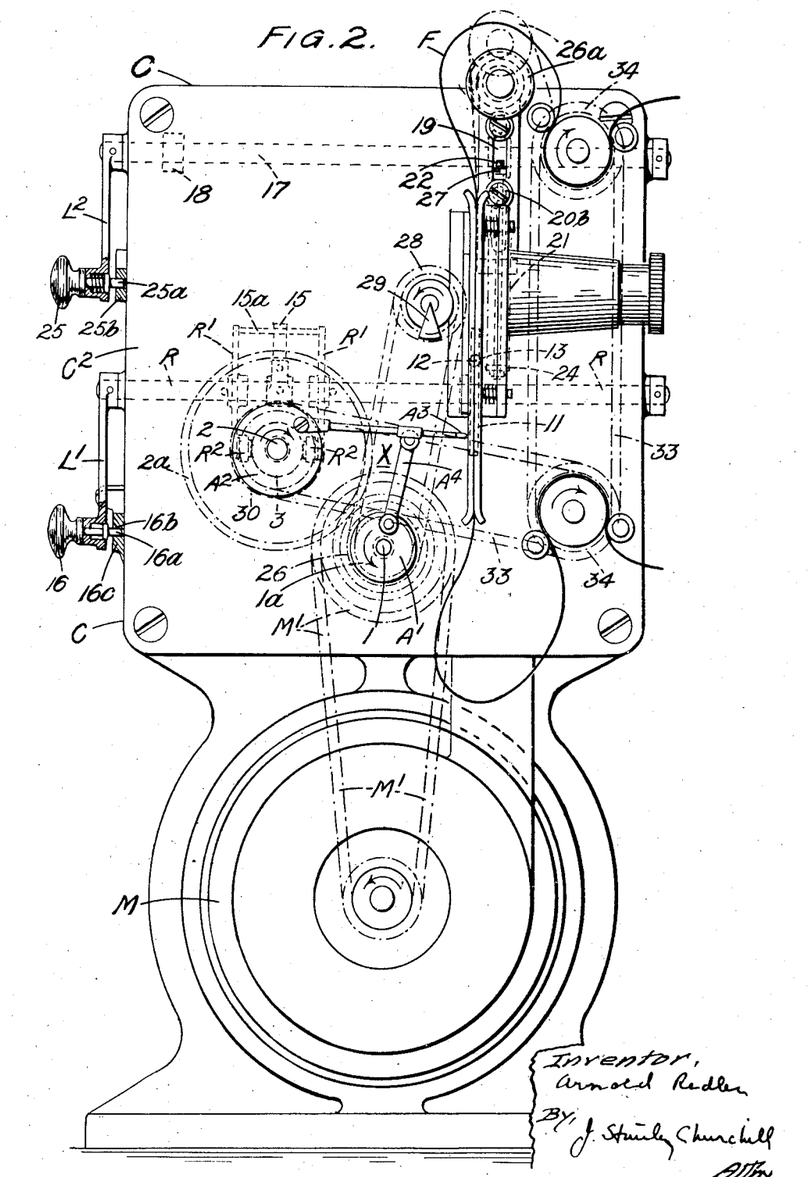
Figure 2 is an elevation of Figure 1 viewed from the right-hand side thereof.

Referring at first to Figures 1 and 2, which show the various features of the invention integral with or built in a machine, the principal features residing in the variable speed film feed drive mechanism between the power unit and the film advance device proper at X. The film advance device X may be of any suitable type as will hereinafter appear, but that illustrated in this example is of known type and comprises two cranks $A^1$ and $A^2$ in geared relationship with one another having thereon respectively a film engaging lever with two prongs $A^3$ and a film advance link $A^4$. In this known type of film feed device the gears are usually in the fixed ratio of 2-1 and the drive is such that the prongs $A^3$ engage the film once at each revolution of the crank $A^2$ while the link $A^4$, owing to its higher gear ratio, advances the film at the maximum speed at every other revolution of crank $A^1$. It will be appreciated that consequently there are two downward movements of the link $A^4$, one to each of the forward or backward movement of the prongs $A^3$ but only the forward position of the prongs can engage the film to change the frame.

According to this invention, the two cranks are not driven in fixed gear ratio but the speed of the crank $A^2$ is made variable while that of the crank $A^1$ remains unaffected. It will be obvious that if the crank A² is driven at a slower speed a longer interval of time will elapse before the prongs A³ are in a position to engage the film; although the crank A¹ has, in the meantime, made its normal number of revolutions only one will be operative to advance the film, i. e., when the prongs A³ are in the forward position to engage the film and the downward pull of the link A⁴ by the crank A¹ coincides therewith.

The mechanism herein proposed for varying the speed of the crank A² and therefore the period of dwell of the film, or in other words the number of successive frames in a unit of time will now be described.

The projection apparatus in the main as regards lens, gate, film, sprockets and the like, are of known construction and need not be described. The apparatus may be hand driven but it is preferred that it be electrically driven by a synchronous or like motor M giving a constant speed drive. The motor M drives through reduction gearing M¹ a driving shaft 1 which carries, at the end remote from the motor drive, the film advance crank A¹ aforesaid, which revolves, preferably, at 32 revs. per second. Parallel with the driving shaft 1 is a change speed shaft 2 at the corresponding end of which is secured the film engaging crank A².

On the driving shaft are secured three driving gears; a fast speed gear 1a, an intermediate speed gear 1b and a slow speed gear 1c; these mesh with gears 2a, 2b and 2c respectively on the countershaft 2, but these latter gears run freely on shaft 2 until coupled thereto as hereinafter described. The ratio of the gears are approximately: 1a to 2a, 1–2; 1b to 2b, 1–4; 1c to 2c, 1–8, the latter through idler reduction gears 2d, allowance being made for the imposed drive of the film advance if an exact agreement with the successive frame speed is required, as will be understood hereinafter.

A sliding double-ended clutch member 3 keyed to the shaft 2 is provided between the gears 2a and 2b, either of which may be coupled to the shaft 2 by movement of the lever L¹ (see Fig. 7A) to the right or left of the central neutral position. The lever L¹ is mounted on a rod R which extends across the casing C of the machine and the rod also carries a pair of levers R¹ having rollers R² which engage an annular groove R³ in the clutch member 3. If the lever L¹ is moved to the right (as in Fig. 8A) the gear 2a will drive the shaft 2 and crank A² at half the speed of the driving shaft 1, i. e., 16 R. P. S.; consequently the prongs A³ will advance the film (through crank A¹ and link A⁴) at that number of frames per second. The gear 2a is shown so engaged in Fig. 8B.

When the lever L¹ is moved to the left to engage the gear 2b, the shaft 2 revolves at 8 R. P. S. and therefore the film is advanced at 8 frames per second also.

As will be seen in Figure 1, the gears 2a, 2b do not engage the shaft directly but through ratchets 4 and 5 respectively. The ratchet 4 is keyed to the shaft 2 and is driven from gear 2a by a forward drive pawl 4a pivoted thereon when the clutch member 3 is clutched in. Similarly the ratchet 5 is driven by a forward pawl 5a mounted on the gear 2b when the clutch member 3 engages the ratchet 5. Each of the ratchets 4, 5 is provided with one forward tooth only and the clutch member 3 can only engage at predetermined points in the circumference of each engaging face; by these means the gears are brought into line in relation to the shaft and the film feed mechanism at every revolution. A further and important reason for this registration will appear later.

Referring now to the drive of the gear 2c, this differs from the two just described as it has further functions to perform. It will be seen on reference to Fig. 1 that the gear 2c is carried on a sleeve 7 clamped to the side plate C¹ of the casing by a nut 7a and a shoulder 7b, the latter within the casing. At the inner end of the sleeve 7 is a bearing plate 7c fixed thereto and adjacent the gear 2c but bearing on a small shoulder on the sleeve 7 is a spring washer 7d. Between the plate 7c and washer 7d is positioned a circular friction plate 8 having in its periphery two notches 8a and 8b respectively (see Fig. 3). The notch 8b is engaged by a pin 2e on the gear 2c. A short leaf-spring-arm 6e is secured to the pawl 6a and projects downwardly therefrom, its end being within the notch 8a.

The action, which is to bring the pawl into engagement with its ratchet, is as follows:—

When the gear 2c is driving in the forward direction (the direction of the arrow W in Fig. 3) the plate 8 is held back by the friction between the washer 7d and stationary abutment 7c until the pin 2e strikes the end of slot 8b. The pin then takes up the drive. This small movement of the plate 8 swings the spring-arm 6e to one side (the left in Fig. 3) and constrains the pawl 6a into engagement with the ratchet 6 and so drives the shaft 2 in the forward direction at one R. P. S. If the gears 2a and 2b are free of the shaft (i. e., declutched) the film will be advanced one frame per second thus giving the longest period of dwell permissible between the frames.

If one of the gears 2a or 2b is in mesh the spring-arm 6e will permit the overrunning of the ratchet 6 by allowing the pawl 6a to lift clear of the teeth but the pawl will immediately re-engage to drive when the ratchet 6 ceases to be driven at a greater speed than that of the gear 2c.

Up to this point it will be realised that when the motor is switched on and the clutch 3 is in neutral, the film will at once be driven intermittently at one frame per second, or if one or other of the gears 2a or 2b be engaged by the clutch, the speed of the film will be at the rate of 8 or 16 frames per second, thus the film can be shown selectively at cine speed or the lowest speed with safety or at a speed intermediate of these.

I now come to an important feature of the invention, namely, the means by which the film is advanced at cine speed (or more) irrespective of the speed of successive frames.

It will be understood that to get smooth and regular running of the film the feed speed factors must take place in a unit of time (e. g., one second) also, when the shaft 2 is running at less than cine speed the film advance drive must be imposed on the successive frame speed (at not less than 16 frames per second) to obtain the necessary quick change of frame.

Figures 4, 6:
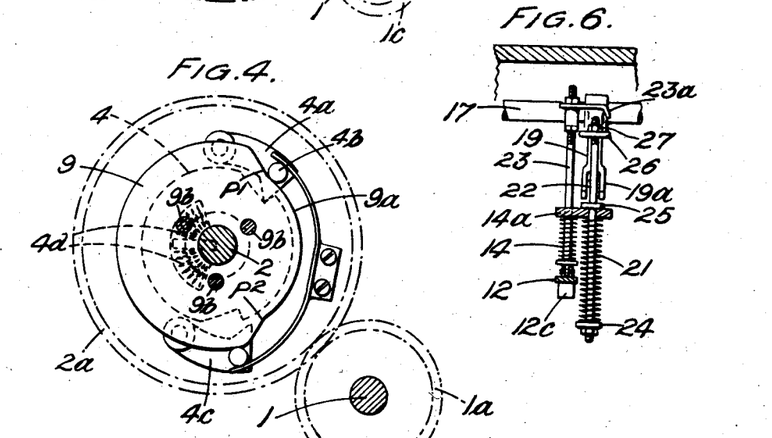
Figure 4 is a corresponding view to Figure 3 taken on the line IV—IV showing the mechanism which controls the film advance feed.
Figure 6 is a fragmentary view of parts associated with the film tensioning device and is a section taken at the line VI in Figure 1.

To do this I have evolved a more simple and effective method than that heretofore proposed. It is as follows:

Concentric with the shaft 2 and between the side casing C² and the ratchet 4 is positioned a disc 9, seen on an enlarged scale in Fig. 4. This disc is fixed to the casing by pins 9b and has on its periphery a depression 9a extending therearound for about a quarter of its circumference.

On the pawl 4a is an extension or pin 4b which overlaps the disc 9 and rides on the periphery thereof.

Assuming the gear 2a to be clutched in, it will be seen on reference to Fig. 4 that as the gear turns clockwise at cine speed the pawl-pin 4b will, at the point P¹, drop down into the depression 9a and, owing to the registering of the ratchets aforesaid, will engage the tooth on ratchet 4, as shown. It will therefore tend to drive the shaft 2 at cine speed also. When the pin 4a reaches the point P² the pawl will be raised from the ratchet. But as the gear 2a is driving, the shaft is being driven at cine speed through the clutch member 3 so by the time the tooth of the ratchet reaches the point P¹ again the pawl 4a has simultaneously reached that point also. There is consequently one advance of the film at every revolution at cine speed, i. e., 16 per second, but as the gear, pawl and shaft are all turning at the same speed, the cam 9 in this case is inoperative, and the pawl slides idly over the cam. Now assuming the clutch 3 to be engaged with the gear 2b: the shaft 2 is being driven at 8 R. P. S., that is, the tooth on the ratchet 4 takes twice as long to reach the point P¹, but the pawl 4a is revolving at twice this speed as it is being freely driven through gear 2a; when therefore it first reaches the point P¹ the tooth is not in position to be engaged; the pawl therefore travels on the edge of the ratchet (the tooth being then on the opposite side of the diameter) and it is only on the second revolution of the gear 2a that the ratchet tooth and the pawl 4a again coincide. When this happens the prongs A³ of the film feed mechanism are about to engage the film, the parts having been registered as aforesaid. During the travel of the pawl 4a from point P¹ to P², the prongs fully engage the film and through link A⁴ the film is advanced at maximum speed. Although the crank A¹ is, in this type of film feed mechanism, running at twice the speed of the crank A² the film cannot be engaged by the prongs unless it is in the forward position. When the gear 2a is clutched to the shaft this engagement takes place at every revolution (16 P. S.) but when the gear 2b is clutched in, the engagement takes place at every other revolution (or 1 in 2) and the film is advanced at 8 frames per second instead of 16 resulting in double the period of dwell for each frame.

Similarly with the gear 2c the gear will drive the shaft 2 at one rev. per sec. through its pawl 6a and ratchet 6. The ratchet 4 being keyed to the shaft 2 also revolves at the same speed. The fast gear 2a is always revolving and when the pawl 4a thereon and the tooth on 4 coincide, the gear 2a picks up the drive and the film will be advanced. As the gear 2a makes 16 revolutions while the ratchet 4 is making one R. P. S., the two will not again coincide until almost the lapse of one second when the pin 4a drops in the depression 9a picks up the ratchet 4 and drives the shaft round at cine speed while the pin travels along the depression 9a. In the meantime, the prongs A³ are in the forward position to engage and the link A⁴ to advance the film. As this takes place only once every second the period of dwell for each frame is therefore of one second duration which is the maximum time permissible under present conditions to expose the film to the heat of the lamp without damage thereto.

It will be noticed that all the gears are always in mesh and being driven. When the motor is switched on, with the clutch in neutral, the lowest gear at once drives the shaft at one revolution per second. If a higher gear is clutched in it overruns the lower, as does the film advance drive for a portion of every revolution of the shaft 2.

It may be desired, in some circumstances, to reverse the action of the film, e. g., to repeat a section for demonstration purposes, or for completely rewinding it. To cater for this an automatic reverse mechanism is provided. Adjacent the ratchet 6 is positioned a second ratchet 10 identical with the first but with teeth set in the opposite direction. The pawl 6 has integral with it but also in the opposite sense a further pawl 10a.

Figure 3:
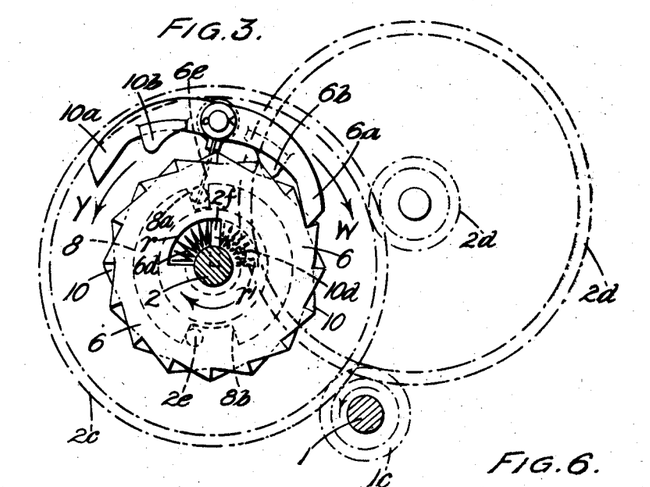
Figure 3 is a detail on an enlarged scale showing automatic reversing mechanism viewed as a section on the line III—III of Figure 1.

When the motor M is reversed, the direction of drive being as the arrow Y in Fig. 3, the friction plate 8 is held back by the spring washer 7d (as in the forward drive but reversed in direction) the gear 2c continues to revolve until the pin 2e contacts with the other end of the slot 8b, at the same time the spring-arm 6e is swung in the opposite direction (to the right in Fig. 3) and the pawl 6a is lifted from the ratchet 6 while the pawl 10a is forced into engagement with the ratchet 10 which then takes up the drive. The gears 2a and 2b have each a reverse driving pawl indicated at 4c and 5c respectively (Fig. 1) and the ratchets 4 and 5 each have a further single notch but reversed in sense. The forward driving pawl 4a is clearly seen engaging the ratchet 4 in Fig. 4 and it will also be noticed that the distance between the leading edges of the pawls 4a and 4c is less than the distance between the notches in the ratchet. This applies also to ratchet 5 and its pawls 5a and 5c, the object being to ensure that the rear pawl cannot engage the ratchet when the drive is reversed until it has made almost a complete revolution. By that time the parts are again in registration to take up the drive from their correct positions in relation to the cam 9. Such relation of pawls to ratchet also allows overrunning of the higher speed when imposed on the lower without fouling the rear pawl of the other ratchet 5.

To obviate any chance of the gears being "stalled" when a higher speed overruns the lowest, provision is made to immediately and forcibly release the engaging pawl. On reference to Fig. 3 it will be observed that each pawl has thereon a side projection 6b and 10b respectively. Each projection extends over the adjacent ratchet and when a pawl is in engagement with its ratchet as 6a, its extension as 6b rests on the tooth on the fellow ratchet immediately behind the leading nose of the pawl.

Each ratchet has a recess $r$ and $r'$ respectively of arcuate form near the shaft 2, as shown, the latter having a feather or key 2f upstanding thereon which extends across the width of both ratchets and within the recesses. One end of each slot bears on each side of the key, a spring 6d or 10d being placed within the recesses which keep the ratchets against the key but pressing in opposite directions and thus the relative positions of the parts are normally maintained.

Should the drive be suddenly reversed and before the automatic reversing means for the pawls of the low speed has had time to set, the ratchets may tend to jam, e. g., if one of the gears started to drive in the direction of arrow Y as the parts are in Fig. 3, the ratchet 6 will be held by the pawl 6a. If the ratchet was fixed to the shaft 2 damage might arise or at least the gears would be "stalled." It will be seen therefore that as the shaft 2 turns anti-clockwise it will forcibly carry the ratchet 10 with it, the key 2f being at the end of its recess $r'$; and the spring $6d$ will be compressed by the key; in the meantime the projection $6b$ will ride up the tooth of the ratchet $10$ on which it rests and so push the pawl $6a$ out of engagement with the ratchet $6$, the spring $6d$ at once returning the ratchet to its original relative position.

It will be appreciated that the conditions are identical throughout the driving mechanism for forward or reverse drives.

The ratchets $4$ and $5$ are each provided with a pair of springs one each side of the key through which the shaft $2$ is driven, those of $4$ being so indicated at $4d$ in Fig. 4, while those of $5$ co-operate with a key on the clutch member $3$. The springs in the ratchets absorb any shocks that may arise when sudden changes of speed occur; a smooth and easy action is thus ensured.

It has been found that while the hand lever $L^1$ can readily be operated to change the film speed from a lower rate to a higher one, it is not easy to anticipate the moment of desired change from a higher to a lower speed as the film is travelling too fast; e. g., if the film is being shown at $16$ frames per second and only one second of time is taken to operate the speed change $16$ frames of film have passed in the meantime and it is practically impossible to judge the point of desired change by eye and hand along without waste of film. It would therefore be of great advantage if the change could be controlled from the film itself as a point on the film could be selected in advance of the actual change which would allow for the small time lag unavoidably incurred before the operation is completed. The following mechanism has been devised to obtain the desired result.

The rod $R$ which carries the selecting lever $L^1$ and the clutch operating arms $R^1$, has a disc $11$ fixedly mounted thereon in the plane of the film. The disc $11$ has two notches in its periphery $11a$ and $11b$ and a small nick $11c$ centrally therebetween. Between the film $F$ and the disc $11$ is a trigger device $12$ which is pivoted near its centre at $12a$ to a bracket $12b$ (see Fig. 1) on the adjacent side $C^2$ of the machine. The trigger $12$ has a catch member $12c$ at the end nearest the disc and, at the end remote therefrom, adjacent the film, a light spring plunger $13$. A spring $14$ under slight compression by a bracket or extension $14a$ normally keeps the catch $12c$ in contact with the disc $11$. The film $F$ is provided with a small notch $F^1$ in its edge nearest the trigger and placed at a selected and suitable point in advance of the desired change of speed which will provide the necessary period of time for the mechanism to operate before that part of the film to be shown at the slower speed has reached the gate.

Figures 7A, 7B, 7C, 8A, 8B, 8C, 9A, 9B, 9C:
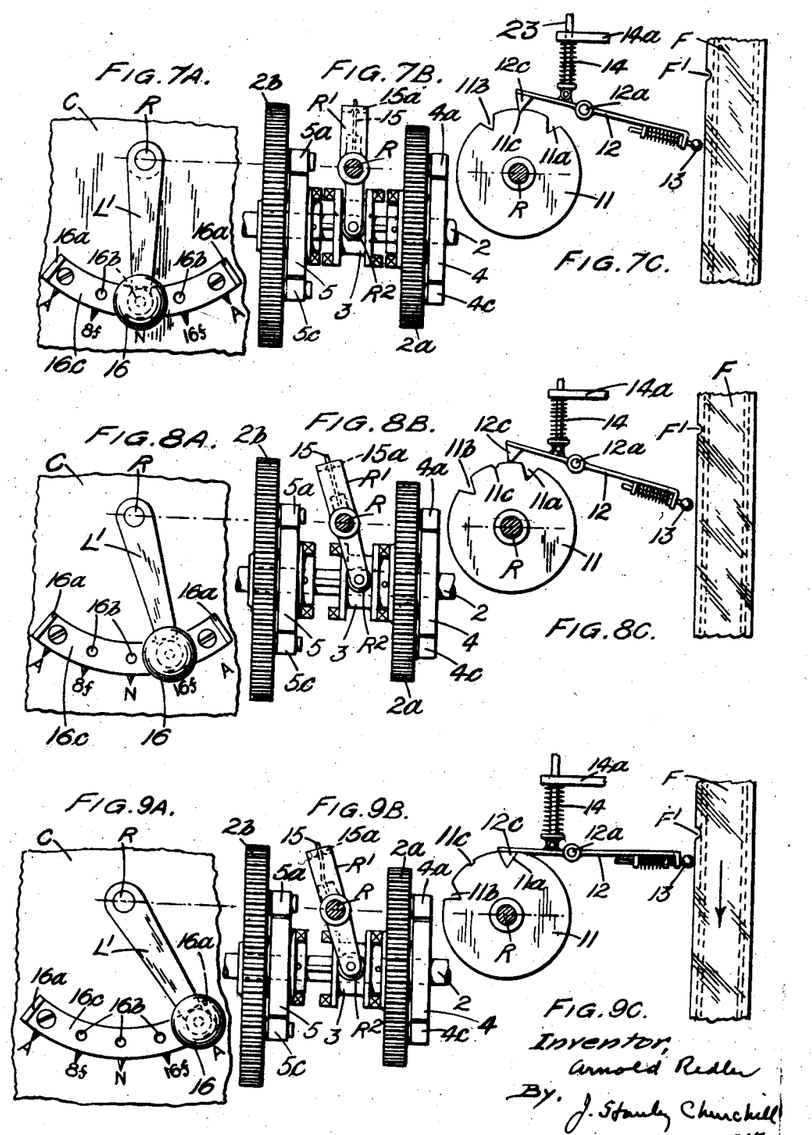

The action of the film control device will be clear from the description which follows:

Figures 7A, 7B and 7C show the various associated parts in the position when all are neutral. It will be noticed that the plunger $13$ is just clear of the edge of the film.

In Figures 8A, 8B and 8C the lever $L^1$ has been moved to the $16$ frames per second position; the gear $2a$ is engaged by the clutch $3$ and although the disc $11$ has also been turned a corresponding amount the plunger $13$ is still clear of the film. The frames are consequently being changed at $16$ per sec. as hereinbefore described. Should it be desired to change the speed automatically by the film control, the lever $L^1$ is moved still further to the right (for forward drive) as in Fig. 9A. The arms $R^1$ do not directly move the clutch member $3$ but through a short leaf-spring $15$ which is secured to a boss which itself is fixed to the shaft $2$ between the two arms $R^1$. The spring $15$ at its outer and free end passes through a yoke member $15a$ connecting the upper ends of the arms $R^1$. When the lever $L^1$ is moved from the position in Fig. 8A to that of 9A this spring $15$ is flexed as shown in Fig. 9B, at the same time the disc $11$ is turned likewise and the catch $12c$ enters the notch $11a$. The trigger $12$ then assumes the horizontal position shown in Fig. 9C and the plunger $13$ lightly contacts with the edge of the film, it being slightly pressed back thereby.

It will be appreciated that the disc $11$ is tending to return to its original position under the stress of the spring $15$.

When the notch $F^1$ in the film engages the plunger $13$ as the film is travelling downwards, the plunger enters the notch, and is thus pulled downwards. The disc retaining catch $12c$ is at once withdrawn from the notch $11a$, the disc swings back and the impulse thus given by the released spring $15$ to the clutch arms $R^1$ returns the clutch to neutral, the weight of lever $L^1$ assisting such action. The small nick $11c$ prevents overrunning of the disc and retains the parts on the rod $R$ at rest which are the positions shown in Figs. 7A, 7B and 7C, respectively.

It will be readily seen that the action is precisely the same, but in the reverse direction as regards the setting of the lever $L^1$ for 8 frames per second, the automatic control therefor and for the clutch members.

On reference to the lever $L^1$ in Fig. 2, it will be seen that the knob $16$ thereon has an extension $16a$ in the form of a small bolt. This bolt $16a$ may enter any one of three holes $16b$ in an arcuate plate $16c$ on the casing; by this means the lever may be positively held in any one of the three selective positions. When at N, although the clutch is neutral, the film is being advanced at one frame per second (by gear $2c$); when at $8f$ at 8 F. P. S.; when at $16f$ at 16 F. P. S., but on moving the lever to A for automatic film control, the bolt $16a$ is withdrawn clear of the plate $16c$ so that it can fall freely on release of the disc $11$ by the trigger $12$. Limiting stops $16d$ are placed one at each end of the plate $16c$ to prevent overflexing the spring $15$ and to locate the disc $11$ with reference to the trigger $12$.

On reversing the drive, i. e., feeding the film backwards, difficulty may arise with certain types of feed mechanism by the gate, or other parts tending to retard the film by excessive friction and thus buckle or otherwise damage it; provision is therefore made to bring into action a film tensioning device situated at the opposite side of the gate to the feed mechanism to ease the passage of the film therethrough. The device is automatically brought into play on reversing the motor.

The mechanism provided for this purpose is as follows:

Positioned vertically above the speed setting lever $L^1$ is a second lever $L^2$ (see Figs. 1 and 2) which is mounted on a rod $17$ extending through the casing and across the machine. This lever $L^2$ controls the motor and may be provided with a lever or the like $18$ for manipulating the various electrical connections, rheostats for the lamp and so forth. A lifting arm $19$ is fixedly mounted on the rod $17$ approximately opposite the film and projects normally downward at about 45° to the horizontal; it has a forked end 19a, the purpose of which will be explained later.

Mounted on the casing adjacent the film is a slide-member 20 which carries at its upper end a roller 20a over which the film passes but normally well clear thereof. Two guide screws 20b pass through a slot 20c in the slide 20, the upper end of the slot acting as a stop for the downward movement of the slide.

At the lower end of the slide 20 is fixed the inwardly projecting bracket 14a, previously referred to. This bracket serves two purposes—firstly to carry a tension spring 21 and its compression rod 22 and, secondly, a trigger "safety" rod 23. The compression rod 22 passes freely through the bracket 14a and the spring 21 surrounds the rod between a retaining collar 24 and the bracket 14a with little or no compression when in the position shown in Fig. 1. A second stop-collar 25 fixed to the rod and resting on the bracket limits its downward movement. At the upper end of the rod 22 is a third lifting-collar 26 adjustable on the rod by a nut 27 or the like.

The lever L² as shown in Fig. 1, is in the forward drive position. If it be moved to the central or vertical position, the motor is switched off but the fork end 19a is not quite in contact with the collar 25.

To reverse the drive the lever L² is switched over to the right; this at once reverses the motor through device 18 and at the same time the forked end 19a of arm 19 embraces the rod, contacts with the collar 25, thus drawing up the rod 22. The spring 21 is thereby compressed and through the spring pressure the slide 20 is raised until the roller 20a takes up the loop in the film (as indicated in chain lines in Fig. 2). This happens before the arm 19 has completed its movement, so that further movement thereof compresses the spring somewhat more and thus the film is maintained in tension a sufficient amount to ease its passage while being fed upwards intermittently through the gate.

On moving the motor lever L² to neutral or forward drive the slide, of course, immediately returns by gravity to the original inoperative position.

On reversing the drive, the trigger 12 may be in danger of fouling the film; to obviate this the second rod 23 is provided. This rod 23 passes freely through the bracket 14a and has at its upper end an adjustable finger 23a which extends over the arm 19 (best seen in Figure 6). As the arm 19 is raised it first lifts the slide 20, the bracket 14a sliding freely up the rod 23 until, near the end of its movement, the arm contacts with the finger 23a thus lifting the catch end of the trigger a small amount. This swings the plunger 13 clear of the film and the latter can thus travel past it with safety. When the slide 20 again descends the bracket 14a compresses the spring 14 the necessary small amount to return the trigger to its original position in contact with the disc 11.

On again referring to Figure 2, it will be seen that the knob 25 of the motor lever L² is provided with, in this instance, a spring bolt 25a so that in whichever of its three positions the lever is placed, it will be held positively by the arcuate plate 25b on the side of the casing.

In projection apparatus as heretofore proposed, it has been necessary to provide special precautions to prevent damage to the film while subjected to the prolonged heat of the lamp when the film is run at a slower than cine speed. This difficulty is very simply overcome in the apparatus herein proposed, namely, by driving the shutter always at a constant and at least cine speed no matter at what speed the film itself is running, the light (and therefore the heating effect) consequently always remains unchanged. For example, in the embodiment hereinbefore described, the shutter is driven at twice cine speed from shaft 1 which is being continuously driven direct from the motor. Mounted on the shaft 1 is a sprocket 26 which, through the chain 27, drives the sprocket 28 on the shaft of which the shutter 29 is secured. It will be realised that the shutter will make two revolutions for each change of frame at 16 F. P. S., four revolutions for each change at 8 F. P. S., and thirty-two for each frame at one per second. This not only ensures even lighting (and heating) throughout but gives also a cine effect when "stills" or slow motion frames are being shown which enhances the result in a marked degree, at the same time obviating the aforesaid disadvantages.

Figure 5:
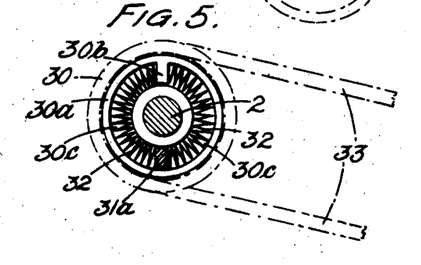
Figure 5 is a cross-section on the line V—V showing the shock absorbing drive for the film sprockets.

As the shaft 2 turns intermittently at various speeds, the film feed sprockets would be subjected to severe shocks at the change of speed if no provision was made to prevent this. Consequently, a shock absorbing device is provided in the driving sprocket 30 on the shaft 2. The device is illustrated in detail by Figure 5, and comprises a hollow sprocket member 30a having integral therewith an inwardly projecting lug 30b extending across the annular space 30c within the sprocket. A complementary collar 31 (see Fig. 1) is pinned to the shaft adjacent the member 30a and has a lug 31a thereon which projects into the annular space aforesaid diametrically opposite the lug 30b. Two helical springs 32 are oppositely placed within the space 30c, their ends contacting with the two lugs.

It will readily be seen that as the shaft 2 revolves, the drive therefrom is transmitted through the collar 31 and lug 31a, first to a spring 30c in advance of the thrust, thence to the sprocket 30 through lug 30b, any sudden shocks being absorbed by the spring 32 to be later expended and so an even drive is maintained. The chain drives from the sprocket 30 to the film-feed sprockets are indicated in Fig. 2 by the references 33 and 34, respectively.

As suggested earlier in this specification, the variable speed drive for successive frames, as herein proposed, and the action of the film advance mechanism thereon imposed, may be adapted to known types of film-feed devices. Three such typical adaptations will now be given by way of example.

Figures 10, 11, 12, 13:
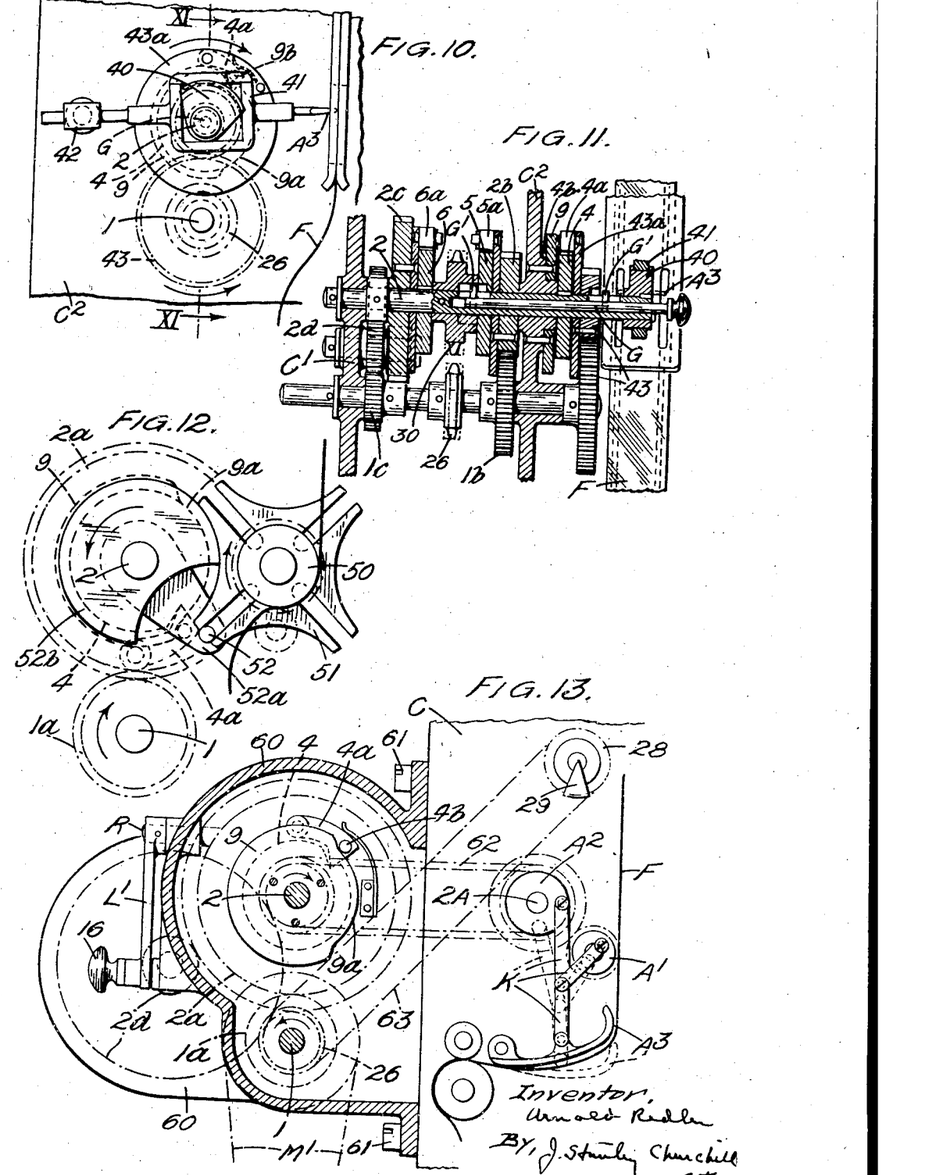
Figures 10 and 11 show a simplified construction having the principal features of the invention adapted to a known type of film feed mechanism, Figure 10 being an end elevation and Figure 11 a longitudinal section in the line XI—XI of Figure 10.
Figure 12 is a partial end view of the driving and driven shafts with the film advance pick-up applied to a second known type of feed mechanism for forward drive only.
Figure 13 shows a third type of known film feed device with the main features of the invention formed as a unit attached to a projector and adapted to drive the feed mechanism in the manner desired.

Referring to Figures 10 and 11: these illustrate a simplified form of the invention with the object of providing a cheaper construction in which only the principal features and their advantages are required and which may be more suitable to small or hand driven machines. The example is shown with a modified form of claw mechanism to advance the film, in that, instead of two cranks as in the previous example, a single cam 40 operates the claw or prong member A³. The cam 40 is surrounded by a rectangular yoke 41, within which the cam rotates. A pivoted guide block 42 or the like, supports the end remote from the prongs and it will be seen that as the cam turns, the prongs are carried forward towards the film F, enter the perforations therein and are then withdrawn after moving downwards through the required distance to advance the film one frame. A relatively short arc only of the cam's movement is actually employed for the film advance operation, so that, if the cam 40 is mounted on shaft 2 as shown, this short arc can be made to coincide with the fast period of drive which is controlled by the fixed cam 9 and thus the film will be advanced correspondingly at cine speed as desired.

In the adaptation being described, the film advance control mechanism is further modified in that it is driven from the shaft 1 by gears 43 outside the casing C. Conveniently, the cam disc 9 is also fixed outside the casing C, as is the ratchet 4, and the co-operating pawl 4a, the latter being pivoted to a relatively large disc 43a fixed to the small gear 43 which is free on the shaft; the large disc and cam provide greater peripheral distances through which the pawl can act effectively. The shaft 1 in this example revolves at eight revolutions per second and the advance feed driving gear 43 is at the ratio of 2-1 as shown; the film change will then be at normal cine speed. It will readily be appreciated that as the shaft 1 is driven at a slower speed than thirty-two revolutions per second, the ratios of the variable speed gears will have to be modified accordingly to speed up the shaft 2 to obtain the same number of frames per second as in the first embodiment.

Consequently in this construction the gears 2a, 2b are of even ratio and the shaft 2 is driven thereby at 8 revs. P. S., while the gears 1c, 2c through the reduction gears 2d give a drive of 8 revs. P. S., down to one for the shaft 2.

A simple form of clutch is provided by which the gears 43 and 2a, 2b may be coupled selectively to the shaft 2. The clutch is in the form of a rod G which may slide axially in a bore in the shaft 2 and has thereon two cross-pins $G^1$ and $G^2$ which can engage alternatively in recesses provided in the small gear 43 or the ratchet 5, respectively. As shown, the rod G is in the neutral position; if moved outwardly to the right the ratchet 5 will be connected to the shaft 2; if pushed inwardly to the left the gear 43 will take up the drive direct to the shaft. It will be appreciated that the gears 43 are equivalent to the gears 1a and 2a and when these are driving the shaft directly at cine speed the film advance mechanism is also being driven at this speed; the pawl 4a is therefore out of action while these gears are driving as in the first embodiment.

Should the ratchet 5 be coupled to the shaft by clutch member $G^1$, the gears 2a, 2b take up the drive at 8 frames per second but the gears 43, although disconnected from the shaft, are still driving the pawl 4a which as soon as its pin 4b enters the depression in the cam 9 immediately picks up the drive and advances the film at cine speed at the appropriate time and for the required amount. The gears 1c, 2c are always driving so that if the clutch is in neutral as shown in Fig. 11, one frame per second is being shown but the gears 43 still advance the film at cine speed between the dwell periods as for the faster drive at 8 per second during part of each revolution of the shaft 2.

It will be clear therefore that as cam 40 revolves during its film engaging movement, it will receive a quick advance from the ratchet 4 at every revolution if the speed of shaft 2 is less than at 16 frames per second, also that if the shaft is driven at 16 R. P. S. (by gears 43) the otherwise overrunning film advance drive is coincident therewith and consequently is in effect out of action, the two driving elements revolving as one as in normal cine operation.

The second adaptation is illustrated to a somewhat enlarged scale diagrammatically in elemental form by Figure 12, the film-feed mechanism itself comprising a Geneva-stop type of intermittent feed. The film feed sprocket 50 is mounted on the slotted cross member 51 which is driven step by step by the pin 52 carried by the arm 52a and cross-retaining-disc 52b, the arm and disc being fixed on the shaft 2, it being understood that the variable speed gears and associated devices may be as either of the two previously described, but the gears 1a and 2a are indicated as in the first example, the directions of drive being reversed. The film, as before, makes one advance at every revolution of the shaft 2, the pin 52 driving the cross member 51 through an angle of 90° each time. The corresponding driving angle through which the pin arm 52a moves coincides with the engagement of the fast drive from ratchet 4 and the extent of the depression in the cam 9, as for the crank $A^2$ and the cam 40 in the previous examples, respectively, the result being that the driving pin-arm 52a turns at a speed agreeing with the setting of the variable speed gears for the major part of a revolution; then if the successive frame speed is less than cine speed at the point of contact of the pin 52 with the cross member 51, the arm is quickly turned through the required angle to advance the film at cine speed for a distance of one frame. When the gears 1a, 2b are driving direct all are being driven at cine speed so the cam 9 will then be inoperative as before.

Figure 13 shows somewhat diagrammatically the third adaptation to a known type of film-feed mechanism; this comprises two cranks in permanent geared relationship in the ratio of 2-1, designated $A^1$ and $A^2$, respectively, and a pivoted plate or beater $A^3$. The cranks and beater are interconnected by the three links K in such manner that, as the cranks revolve, the beater is given an intermittent downward thrust which advances the film a distance equal to one frame. At a certain point in a revolution of crank $A^2$ (about that shown) the two cranks act together to advance the crank $A^2$ for a quarter of a revolution, and $A^1$ for a half revolution. The advance can only take place when the parts are in such agreement, as in all other positions the beater is clear of the film; the crank $A^2$ thus times the action of the parts and it will therefore readily be seen that if the speed of the crank $A^2$ was made variable the successive frame speed would also be variable. The present invention can in consequence be easily adapted to such a film feed mechanism by adding the variable speed devices to the shaft 2a on which the crank $A^2$ is secured.

Instead of so doing, however, and as a further example of how the invention may be adapted, the variable speed gears and film advance control is shown composed as a unit attached to the casing of a cine projector.

The attachment comprises a subsidiary casing 60 secured to the casing C by screws 61 or the like. The two shafts 1 and 2 are journalled in the ends of casing 60, the shaft 1 being driven from the motor by a chain $M^1$ at constant speed. The shaft 2 has on it the variable speed gear devices and the film advance control substantially as illustrated in Figure 1 of the first embodiment (but for simplicity without the reverse drive mechanisms) the disc 9 in this case, of course, being fixed to an end of casing 60. A chain 62 connects the shaft 2 to the shaft $2^A$, the sprockets on each shaft being of the same diameter; the drive and speed of both will therefore be identical. By making the position of the cranks A¹ and A² when they are about to advance the film coincide with the engagement of the pawl 4a with the ratchet 4 as the pin 4b enters the depression 9a in the disc 9, it will be seen that the film will be quickly advanced at the appropriate time and at the desired speed. The number of frames advanced per second will be controlled as before by the particular gear selected, which correspondingly affects the speed of crank A² and therefore the interval of time between the effective thrusts of the beater A³ and the film advance.

To obtain the advantages of a shutter driven at constant speed with this attached gear unit, as hereinbefore enumerated, a chain 63 is provided which connects the constant speed shaft 1 direct to the shutter sprocket as shown.

The film sprocket drives will be from shaft 2 or the equivalent in each of the adaptations as will be readily understood.

It will also be appreciated that in the subsidiary examples above described, the reverse drive mechanism; the film tensioning mechanism; or the film control trigger device; may or may not be incorporated as found suitable or desirable.

If desired, the speed changing means may be operated from a distance, instead of at the apparatus as described. Such means may take the form of a Bowden wire or pneumatic leads or the like, a suitable operating device being held in the hand and manipulated e. g., as remarks are being made about the film being shown. Such an arrangement may easily be embodied in the construction illustrated in Fig. 11 by attachment to the rod G, as will be readily understood.

It will be appreciated that the ratio and speed figures given herein as examples are relative only and may be altered as found suitable or desired, also that if a variable speed motor was used the speeds and ratios would be modified accordingly.

It will be understood that various modifications may be made in the details of the invention provided the main spirit thereof is not departed from.

What I claim is:

1. In cinematograph apparatus, feeding mechanism comprising a feeding member cooperating with the film, and means for operating the feeding member to vary the frequency of successive frames while maintaining the rate of shifting from one frame to the next at a sufficiently high speed to assure persistency of vision, said operating means including an element driven at a constant rate of speed, a variable speed element, coupling means between said elements, and means cooperating with said coupling means for increasing the speed of said variable speed element during the film shifting period of operation.

2. In cinematograph apparatus, feeding mechanism comprising feeding means cooperating with the film, means for operating said feeding means at a relatively low frame frequency to cause each frame to dwell for a relatively long time and during a major portion of each cycle of operation while maintaining the speed of shifting succeeding frames into operative position at a sufficiently high speed to insure persistency of vision, said operating means including a shaft driven at a constant rate of speed, a variable speed shaft, coupling means between said shafts, and means cooperating with said coupling means for increasing the speed of said variable speed shaft during the film shifting portion of each cycle of operation.

3. In cinematograph apparatus, film feeding mechanism comprising a feeding member cooperating with the film, means for operating the feeding member including means for effecting a frame frequency of the order of sixteen frames per second, and means for reducing the frame frequency to the order of one frame per second while maintaining the film shifting speed at a rate of the order of sixteen frames per second, said operating means including a shaft driven at a constant rate of speed, a variable speed shaft, coupling means between said shafts, and means cooperating with said coupling means for increasing the speed of said variable speed shaft during the film shifting portion of each cycle of operation.

4. In cinematograph apparatus, film feeding mechanism comprising a feeding member cooperating with the film to advance successive frames to a predetermined operating position, means for operating the feeding member including a shaft driven at a constant rate of speed, a variable speed shaft for varying the number of successive frames advanced, coupling means between said shafts, and means cooperating with said coupling means for increasing the speed of said variable speed shaft at predetermined intervals corresponding to the number of successive frames to effect advance of the film from one frame to the next at a maximum speed.

5. In cinematograph apparatus, film feeding mechanism comprising a feeding member cooperating with the film, means for operating the feeding member including a shaft driven at a constant rate of speed, a variable speed shaft for varying the frequency of successive frames, coupling means between said shafts, and means cooperating with said coupling means for increasing the speed of said variable speed shaft at predetermined intervals corresponding to the frequency of successive frames to effect shifting of the film from one frame to the next at a constant maximum speed.

6. In cinematograph apparatus, film feeding mechanism comprising a feeding member cooperating with the film, means for driving the feeding member including a continuously rotating shaft, means for reducing the speed of rotation of said shaft to reduce the frequency of successive frames per second, and means for increasing the speed of said shaft at predetermined intervals corresponding to the frequency of successive frames to effect shifting of the film from one frame to the next at a maximum speed.

7. In cinematograph apparatus, film feeding mechanism comprising a feeding member cooperating with the film, means for operating the feeding member including a driving shaft rotated at a constant speed, a continuously driven shaft, and connections between said shafts including means for reducing the speed of rotation of said continuously driven shaft to reduce the frequency of successive frames per second, said connections including means for coupling said shafts to permit an increase in the speed of the continuously driven shaft at a predetermined interval in each revolution of the latter whereby to effect shifting of the film from one frame to the next at a maximum rate during operation at said reduced frequency.

8. In conematograph apparatus, film feeding mechanism comprising a feeding member for effecting intermittent feeding movement of the film, means for operating the feeding member including a driving shaft rotated at a constant speed, a continuously driven shaft, and connections between said shafts to effect rotation of the continuously driven shaft at reduced speeds to reduce the frequency of successive frames, said connections including means for permitting an increase in the speed of the continuously driven shaft during a predetermined part of each cycle of operation corresponding to said reduced frequency whereby to effect shifting of the film from one frame to the next at a constant maximum speed.

9. In cinematograph apparatus, film feeding mechanism comprising a feeding member for effecting intermittent feeding movement of the film, means for operating the feeding member including a driving shaft rotated at a constant speed, a continuously driven shaft, and connections between said shafts to effect rotation of the continuously driven shaft at reduced speeds to reduce the frequency of successive frames, said connections including means for permitting an increase in the speed of the continuously driven shaft during a predetermined part of each cycle of operation corresponding to said reduced frequency whereby to effect shifting of the film from one frame to the next at a constant maximum speed, a shutter, and driving connections between said drive shaft and the shutter to maintain a constant speed of the latter irrespective of variations in frequency of successive frames per second.

10. In cinematograph apparatus, film feeding mechanism comprising a feeding member cooperating with the film, means for operating the feeding member including a driving shaft rotated at a constant speed, a driven shaft, connections between said shafts for reducing the speed of rotation of said driven shaft to reduce the frequency of successive frames, said connections including coupling means arranged to permit an increase in the speed of the driven shaft during a predetermined part of each cycle of operation, and a stationary cam cooperating with said coupling means whereby to effect shifting of the film from one frame to the next at a constant maximum speed.

11. In cinematograph apparatus, film feeding mechanism comprising a feeding member cooperating with the film, means for operating the feeding member including a driving shaft rotated at a constant speed, a driven shaft, connections between said shafts for reducing the speed of rotation of said driven shaft to reduce the frequency of successive frames, said connections including coupling means arranged to effect an increase in the speed of said driven shaft, and a stationary cam cooperating with said coupling means arranged to render the latter operative to increase the speed of said driven shaft during the film shifting portion of each cycle of operation whereby to effect shifting of the film from one frame to the next at a constant maximum speed.

12. In cinematograph apparatus, film feeding mechanism for effecting intermittent feeding movement of the film comprising a feeding member, and operating means for said feeding member arranged to vary the frequency of successive frames per second while maintaining the speed of shifting from one frame to the next at a constant rate, said operating means including a rotating shaft, coupling means arranged to effect an increase in the rotation of said shaft, and a stationary cam cooperating with said coupling means arranged to render the latter operative during the film shifting portion of each cycle of operation.

13. In cinematograph apparatus, film feeding mechanism comprising a feeding member for effecting intermittent feeding movement of the film, means for operating the feeding member including a driving shaft rotated at a constant speed, a continuously rotated driven shaft, and connections between said shafts to effect rotation of the continuously rotated driven shaft at varying speeds to vary the frequency of successive frames, said connections including means for permitting an increase in the speed of the continuously rotated driven shaft during the film shifting period of operation when being operated at a reduced frequency whereby to effect shifting of the film from one frame to the next at a constant maximum speed.

14. In cinematograph apparatus, film feeding mechanism comprising a feeding member for effecting intermittent feeding movement of the film, means for operating the feeding member including a driving shaft rotated at a constant speed, a continuously rotated driven shaft, and connections between said shafts to effect rotation of the continuously rotated driven shaft at varying speeds to vary the frequency of successive frames, said connections including means for permitting an increase in the speed of the continuously rotated driven shaft during the film shifting period of operation when being operated at a reduced frequency whereby to effect shifting of the film from one frame to the next at a constant maximum speed, said connections being operative to effect reversal of the feeding movement upon reversal of rotation of said shafts.

15. In cinematograph apparatus, film feeding mechanism comprising a feeding member for effecting intermittent feeding movement of the film, means for operating the feeding member including a driving shaft rotated at a constant speed, a continuously rotated driven shaft, and connections between said shafts to effect rotation of the continuously rotated driven shaft at varying speeds to vary the frequency of successive frames, said connections including means for permitting an increase in the speed of the continuously rotated driven shaft during the film shifting period of operation when being operated at a reduced frequency whereby to effect shifting of the film from one frame to the next at a constant maximum speed, said connections being operative to effect reversal of the feeding movement upon reversal of rotation of said shafts, and means for automatically tensioning the film during such reverse movement.

16. In cinematograph apparatus, film feeding mechanism comprising a feeding member for effecting intermittent feeding movement of the film, means for operating the feeding member including a driving shaft rotated at a constant speed, a continuously rotated driven shaft, and connections between said shafts to effect rotation of the continuously rotated driven shaft at varying speeds to vary the frequency of successive frames, said connections including means for permitting an increase in the speed of the continuously rotated driven shaft during the film shifting period of operation when being operated at a reduced frequency whereby to effect shifting of the film from one frame to the next at a constant maximum speed, and means controlled by the film for varying the frequency of successive frames.

ARNOLD REDLER.